Patented Aug. 3, 1943

2,325,882

UNITED STATES PATENT OFFICE 2,325,882

ROD WEEDER

Arthur A. Scarlett, Hamilton, Ontario, Canada, assignor, by mesne assignments, to International Harvester Company, Chicago, Ill., a corporation of New Jersey Application October 30, 1940, Serial No. 363,527

4 Claims. (Cl. 97—42)

The present invention relates to ground-working implements, and more specifically it relates to a rod weeder type of implement.

It is desirable in rod weeders to have a weeder which is light in weight and which can be readily adjusted from an operating position to a transport position. It is also desirable to provide a frame for a rod weeder which is of light weight, but torsionally strong.

It is, therefore, an important object of the present invention to provide an improved rod weeder.

Another object of the invention is to provide an improved rod weeder frame structure which is torsionally strong.

Another object of the invention is to provide an improved means for adjusting the rod weeder from an operating position to a transport position.

According to the present invention, the rod weeder is provided with the usual wheel supported frame to which is pivotally connected a hitch device. The wheel supported frame has the usual rotatable mounted weeder rod supported therefrom which is adapted to operate beneath the surface of the soil. The weeder rod is driven from one of the wheels that support the frame. On the hitch device is mounted a tripod structure on which is pivotally mounted a threaded sleeve. On the wheel supported frame of the rod weeder is mounted a stabilizing means which consists of a plurality of rods that form a pyramid brace for the frame. A threaded rod is connected to the pyramid brace and to the threaded sleeve. A crank is secured to the threaded sleeve, which, upon rotation, adjusts the frame structure about its wheel supports.

Other objects and advantages of the present invention will become apparent from the following detailed description of a preferred embodiment of the invention illustrated in the accompanying drawings, in which.

Figure 1:
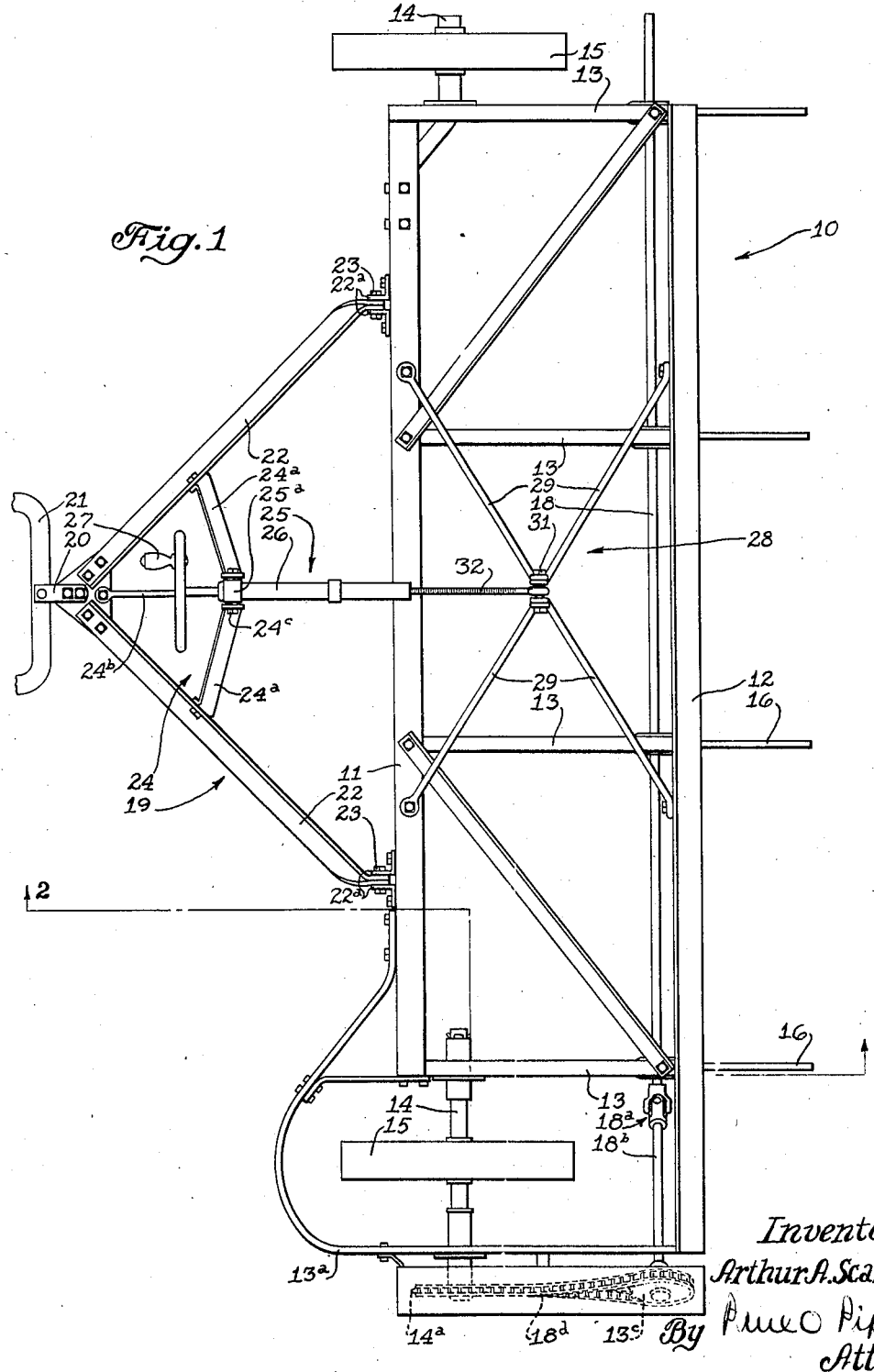
Figure 1 is a plan view of the improved rod weeder construction.

As shown in Figure 1 of the drawings, the rod weeder consists of a frame structure 10 which comprises a front transverse frame member 11 and a rear transverse frame member 12. The frame members 11 and 12 are connected by generally longitudinally disposed members 13. At each end of the rod weeder frame 10 is provided an axle 14. On the right side of the machine, a wheel 15 is rotatably mounted on the axle 14. At the left side of the frame 10 is provided a wheel supporting bar 13a which is secured to the front frame member 11 and the rear frame member 12. The axle 14 at the left side of the frame 10 is journaled in suitable bearings provided on the wheel supporting bars 13a and the left longitudinally disposed member 13. A wheel 15 and a sprocket 14a are fixed to the axle 14. On rotation of the wheel 15 the sprocket 14a is also rotated. Downwardly curved standards 16 are secured to the rear end of each of the longitudinally disposed members 13. The usual rod weeder shoe 17 is secured to the ends of the downwardly curved standards 16, and the usual weeder rod 18 is journaled in the shoes 17. The left end of the weeder rod 18 is connected by a universal joint 18a with an inclined rod 18b which is journaled at its upper end in the bar 13a. A sprocket 13c is provided at the upper end of the inclined rod 18b. A chain 18d, trained around the sprocket 14a and the sprocket 13c, drives the weeder rod 18 on rotation of the wheel 15 at the left side of the frame 10. On the front transverse frame member 11 is pivotally connected a draft device in the form of a hitch 19 which comprises a clevis 20 that may be connected to the draw-bar 21 of a tractor or any suitable draft device. From the clevis 20 extends a pair of angles 22, which are pivotally connected to a pair of spaced brackets 22a which are secured on the front transverse beam 11 by bolts 23. On the hitch device 19, a supporting structure or tripod 24 is secured which comprises a pair of bars 24a and a rod 24b. One end of each of the bars 24a and the rod 24b are secured together by a bolt 24c, and the other end of the bars 24a and the rod 24b are secured to the draft device 19 at spaced points. The upper ends of the bars 24a are provided with alined openings 24d. In the alined openings 24d, at the upper end of the tripod 24 is pivotally mounted an adjusting device 25 which consists of a trunnion 25a in which is rotatably mounted a threaded sleeve 26 to which is secured a crank 27.

The weeder frame 10 is provided with a stabilizing means in the form of a pyramid of braces 28. The stabilizing means 28 comprise a plurality of rods 29 which are secured at spaced points to the front transverse frame member 11 and at spaced points to the rear transverse frame member 12. The rods 29 converge upwardly and inwardly and are connected by a bolt 31. A threaded rod 32 is turned into the threaded sleeve 29 and is connected to the pyramid of rods by the bolt 31.

Figure 2:
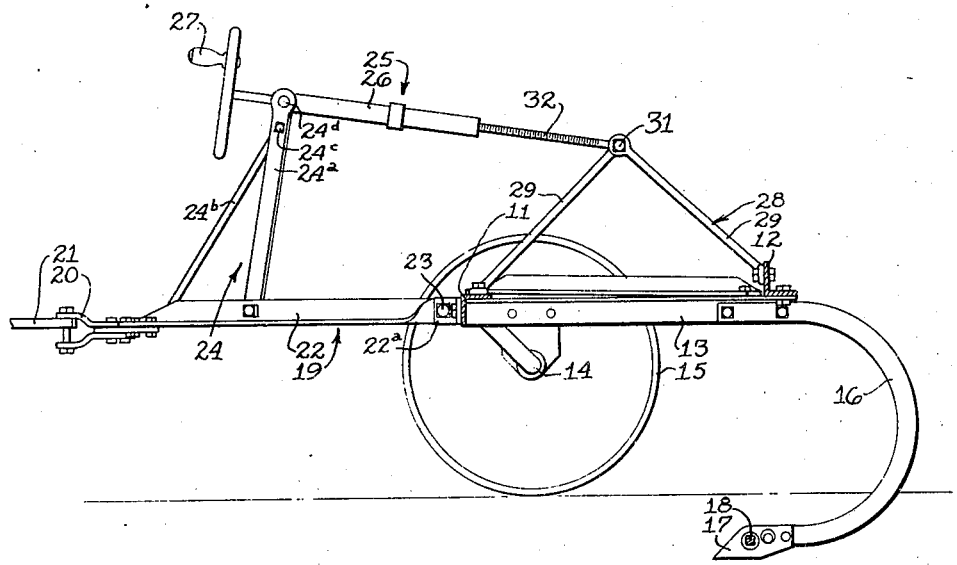
Figure 2 is a sectional view taken along the line 2—2 of Figure 1 and showing the rod weeder in an operating position; and, Figure 3 is a sectional view similar to Figure 2, but showing the rod weeder in a transport position.

By providing the rod weeder frame 10 with the stabilizing means 28, the frame is made torsionally strong. It has been found in operating ordinary rod weeders that when the weeder rod 18 is in an operating position as shown in Figure 2, if the weeder rod encounters a hard spot in the ground, one end of the weeder rod will tend to ride up out of the ground and the other end of the weeder rod will tend to go deeper into the ground. The stabilizing means 28 prevents this since the front and rear transverse frame members 11 and 12 are held against twisting movement.

Figure 3:
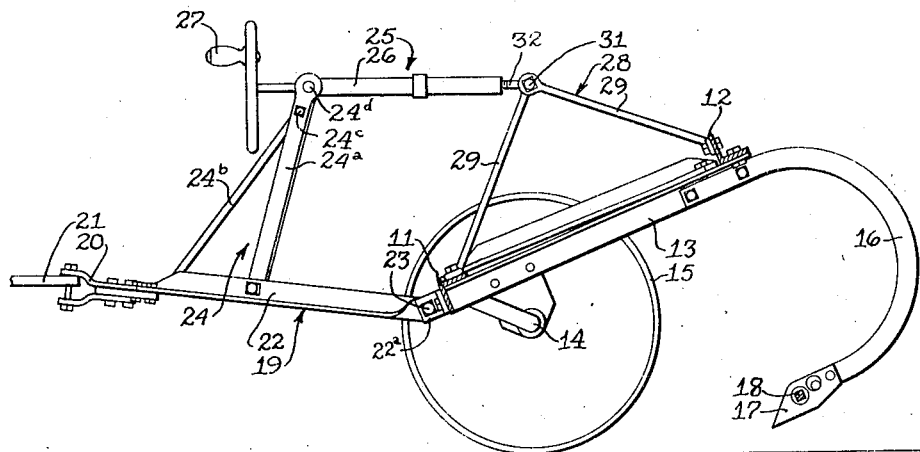

Referring to Figures 2 and 3, when it is desired to adjust the weeder rod 18 the crank 27, which is within reach of the operator on the draft device, may be rotated so as to raise or lower the rod about the wheel supports 15 of the rod weeder frame 10. Since the clevis 20 is connected to the draw-bar 21, it is held against vertical movement, and the frame 10 will move upwardly or downwardly about the wheel supports as a pivot by virtue of the pivotal connection of the hitch device 19 to the front transverse frame member 11 of the rod weeder frame 10.

From the foregoing description it is obvious that an improved stabilizing means has been provided for a rod weeder frame, and that an improved adjusting means has been provided for a wheel supported rod weeder frame having an earth-working tool. The rod weeder is simple and economical to manufacture and is of much lighter weight than previous machines of this type. It is to be understood that the applicant has shown and described only one embodiment of his improved rod weeder, but that he claims all modifications falling within the terms of the appended claims.

What is claimed is:

1. In combination, a rectangular frame structure comprising transversely spaced members connected by longitudinally spaced members, a draft device pivotally connected to one of the transverse members, a stabilizing means for the said frame structure comprising a plurality of rods secured together at one end and extending downwardly and outwardly and secured to the frame at spaced points, a supporting structure mounted on said draft device comprising a plurality of bars secured together at one end and extending outwardly and downwardly and secured to the draft device at spaced points, and an adjusting device connecting said stabilizing means and said supporting structure.

2. In an agricultural implement: a generally rectangular frame having opposed, transverse front and rear frame members connected at opposite ends by opposed, longitudinal side frame members, said frame members being disposed generally in a common plane; stabilizing means on the frame for maintaining the frame members in the aforesaid plane, said means including a plurality of brace members diagonally cross-connecting opposed frame members, and means rigidly connecting said brace members; a support on the draft device; and adjustable means connecting the support on the draft frame and the stabilizing means on the implement frame for adjusting the implement frame relative to the draft device.

3. In an agricultural implement: a generally rectangular frame having opposed, transverse front and rear frame members connected at opposite ends by opposed, longitudinal side frame members, said frame members being disposed generally in a common plane; stabilizing means on the frame for maintaining the frame against substantial distortion from the aforesaid plane, said means including a plurality of brace members arranged as a pyramid and diagonally cross-connecting opposed frame members, and means rigidly connecting said brace members; a support on the draft device; and adjustable means connecting the support on the draft frame and the stabilizing means on the implement frame for adjusting the implement frame relative to the draft device.

4. In combination, a wheeled implement frame having relatively long, transverse front and rear frame members and relatively short, generally longitudinal frame members connecting said transverse members, a hitch pivotally connected to the front frame member and extending forwardly therefrom generally on the longitudinal centerline of the frame, a support on the hitch, a plurality of brace members secured at spaced points to the front and rear frame members at opposite sides of the longitudinal centerline of the frame and converging to a common connection substantially vertically alined with the intersection of the longitudinal and transverse centerlines of the frame; and adjustable means connecting the support on the hitch and the common connection of the brace members for adjusting the implement frame and hitch relatively.

ARTHUR A. SCARLETT.